(12) United States Patent
Jonsson et al.

(10) Patent No.: US 11,237,243 B2
(45) Date of Patent: Feb. 1, 2022

(54) METHOD, DEVICE, COMPUTER PROGRAM AND COMPUTER PROGRAM PRODUCT FOR DETERMINING WHETHER A PORTABLE KEY DEVICE IS LOCATED IN AN ACTIVE AREA IN RELATION TO A BARRIER

(71) Applicant: ASSA ABLOY AB, Stockholm (SE)

(72) Inventors: Tomas Jonsson, Ronninge (SE); Hakan Olsson, Hagersten (SE)

(73) Assignee: ASSA ABLOY AB, Stockholm (SE)

( * ) Notice: Subject to any disclaimer, the term of this patent is extended or adjusted under 35 U.S.C. 154(b) by 236 days.

(21) Appl. No.: 15/561,373

(22) PCT Filed: Mar. 24, 2016

(86) PCT No.: PCT/EP2016/056606
§ 371 (c)(1),
(2) Date: Sep. 25, 2017

(87) PCT Pub. No.: WO2016/156231
PCT Pub. Date: Oct. 6, 2016

(65) Prior Publication Data
US 2018/0081025 A1    Mar. 22, 2018

(30) Foreign Application Priority Data
Mar. 27, 2015    (EP) .................... 15161372

(51) Int. Cl.
*G01S 5/06* (2006.01)
*G01S 3/46* (2006.01)
(Continued)

(52) U.S. Cl.
CPC ............. *G01S 5/06* (2013.01); *B60R 25/245* (2013.01); *G01S 3/46* (2013.01); *G07C 9/28* (2020.01); *G07C 2209/63* (2013.01)

(58) Field of Classification Search
CPC ..... G01S 5/06; G01S 3/46; G01S 3/50; G01S 5/12; G07C 9/00111; G07C 2209/63; B60R 25/245
(Continued)

(56) References Cited

U.S. PATENT DOCUMENTS 6,661,335 B1    12/2003 Seal
7,446,644 B2    11/2008 Schaffzin et al.
(Continued)

FOREIGN PATENT DOCUMENTS

CN          104221413       12/2014
WO    WO 2012/174387       12/2012
(Continued)

OTHER PUBLICATIONS

Official Action for European Patent Application No. 15161372.6, dated Nov. 16, 2018, 4 pages.
(Continued)

*Primary Examiner* — Michael Y Mapa
(74) *Attorney, Agent, or Firm* — Sheridan Ross P.C.

(57) ABSTRACT

It is presented a method for determining whether a portable key device is located in an active area in relation to a barrier. The method is performed in an access control device and comprises the steps of: detecting an angle of arrival of a wireless signal from the portable key device using a pair of antennas provided such that a line between the pair of antennas crosses the barrier; and determining whether the portable key device is located within the active area based on the angle of arrival.

13 Claims, 3 Drawing Sheets

(51) Int. Cl.
*B60R 25/24* (2013.01)
*G07C 9/28* (2020.01)
(58) Field of Classification Search
USPC .............................................. 455/456.1–457
See application file for complete search history.

(56) References Cited

U.S. PATENT DOCUMENTS

| | | | |
|---|---|---|---|
| 8,009,023 | B2 | 8/2011 | Bergerhoff et al. |
| 9,008,854 | B2 | 4/2015 | Breed |
| 2004/0075046 | A1* | 4/2004 | Beggs ................ E05F 15/73 250/221 |
| 2006/0279401 | A1 | 12/2006 | Yoshii et al. |
| 2008/0061964 | A1 | 3/2008 | Yoshida et al. |
| 2008/0092443 | A1* | 4/2008 | Herman ............... E05F 15/77 49/25 |
| 2011/0298600 | A1 | 12/2011 | Fujioka et al. |
| 2011/0309982 | A1 | 12/2011 | Poisel |
| 2012/0286926 | A1 | 11/2012 | Higemoto et al. |
| 2013/0176107 | A1 | 7/2013 | Dumas et al. |
| 2013/0241694 | A1 | 9/2013 | Sharma et al. |
| 2014/0162704 | A1* | 6/2014 | Choi ................... H04W 64/00 455/456.6 |
| 2014/0225713 | A1* | 8/2014 | McIntyre ........... G07C 9/00904 340/5.61 |
| 2015/0189619 | A1 | 7/2015 | Kalliola et al. |
| 2017/0303094 | A1 | 10/2017 | Collar et al. |

FOREIGN PATENT DOCUMENTS

| | | |
|---|---|---|
| WO | WO 2013/087787 | 6/2013 |
| WO | WO 2014/007754 | 1/2014 |
| WO | WO 2015/010734 A1 | 1/2015 |
| WO | WO 2013/084030 | 6/2016 |

OTHER PUBLICATIONS

International Search Report prepared by the European Patent Office dated Jul. 25, 2016, for International Application No. PCT/EP2016/056597.
Written Opinion prepared by the European Patent Office dated Jul. 25, 2016, for International Application No. PCT/EP2016/056597.
International Preliminary Report on Patentability (Chapter II) prepared by the European Patent Office dated Jan. 27, 2017, for International Application No. PCT/EP2016/056597.
Second Written Opinion prepared by the European Patent Office dated Mar. 7, 2017, for International Application No. PCT/EP2016/056597.
Applicant's Response to the Second Written Opinion dated May 5, 2017, for International Application No. PCT/EP2016/056597.
Official Action for European Patent Application No. 15161367.6, dated Nov. 16, 2018, 5 pages.
Official Action for U.S. Appl. No. 15/561,228, dated May 17, 2018 10 pages.
Notice of Allowance for U.S. Appl. No. 15/561,228, dated Oct. 24, 2018 10 pages.
Official Action with English Translation for China Patent Application No. 201680018287.8, dated Jan. 21, 2019, 14 pages.
International Search Report prepared by the European Patent Office dated Jul. 25, 2016, for International Application No. PCT/EP2016/056606.
Written Opinion prepared by the European Patent Office dated Jul. 25, 2016, for International Application No. PCT/EP2016/056606.
International Preliminary Report on Patentability (Chapter II) prepared by the European Patent Office dated Jun. 19, 2017, for International Application No. PCT/EP2016/056606.
Second Written Opinion prepared by the European Patent Office dated Mar. 7, 2017, for International Application No. PCT/EP2016/056606.
Applicant's Response to the Second Written Opinion dated May 5, 2017, for International Application No. PCT/EP2016/056606.
Official Action with English Translation for China Patent Application No. 201680018287.8, dated Oct. 8, 2019, 9 pages.
Summons to Attend Oral Proceedings for European Patent Application No. 15161372.6, dated Jul. 18, 2019 5 pages.
Official Action with English Translation for China Patent Application No. 201680018287.8, dated May 8, 2020, 13 pages.
Official Action for China Patent Application No. 201680018287.8, dated Aug. 27, 2020, 9 pages.

* cited by examiner

METHOD, DEVICE, COMPUTER PROGRAM AND COMPUTER PROGRAM PRODUCT FOR DETERMINING WHETHER A PORTABLE KEY DEVICE IS LOCATED IN AN ACTIVE AREA IN RELATION TO A BARRIER

CROSS REFERENCE TO RELATED APPLICATIONS

This application is a national stage application under 35 U.S.C. 371 and claims the benefit of PCT Application No. PCT/EP2016/056606 having an international filing date of 24 Mar. 2016, which designated the United States, which PCT application claimed the benefit of European Patent Application No. 15161372.6 filed 27 Mar. 2015, the disclosure of each of which are incorporated herein by reference.

TECHNICAL FIELD

The invention relates to a method, access control device, computer program and computer program product for determining whether a portable key device is located within the active area positioning of a portable key device using two antennas.

BACKGROUND

Lock devices and key devices are evolving from the traditional pure mechanical locks. These days, there are wireless interfaces for electronic lock devices, e.g. by interacting with a portable key device. For instance, Radio Frequency Identification (RFID) has been used as the wireless interface. When RFID is used, the user needs to present the portable key device very close to a reader of the lock. However, in order to provide a more user friendly solution, wireless interfaces with greater range are starting to be used. This allows the interaction between the portable key device and the lock to occur without user interaction, e.g. with a portable key device being located in a pocket or handbag. However, in such a situation, there is a risk that someone on the inside unlocks the lock device by simply walking by the lock device. In order to prevent this from happening, without introducing user interaction to open the lock device, there needs to be a way to determine whether a portable key device is on the inside or on the outside. In this way, automatic access control could be disabled for inside devices, preventing inadvertent unlocking.

US 2013/0176107 presents a wireless access control system includes a remote access device and an electronic lock. The electronic lock communicates with the remote access device. The electronic lock controls the ability to lock and unlock a door in which the electronic lock is disposed. The electronic lock determines when the remote access device is at a distance less than or equal to a predetermined distance from the lock to enable the lock to be unlocked. More specifically, an internal antenna and an external antenna are used to determine which side the user is on. If a calibrated RSSI from the internal antenna is greater than the RSSI reading or readings from external antenna, user is determined to be on the inside.

However, such a determination of position based on dual antenna RSSI is not always ideal. In some circumstances, radio signals are distorted by reflections and fading which depends on external objects and interference, which can not be reliably controlled.

SUMMARY

It is an object to increase the accuracy in determining whether a portable key device is located in an active area in relation to a barrier.

According to a first aspect, it is presented a method for determining whether a portable key device is located in an active area in relation to a barrier. The method is performed in an access control device and comprises the steps of: detecting an angle of arrival of a wireless signal from the portable key device using a pair of antennas provided such that a line between the pair of antennas crosses the barrier; and determining whether the portable key device is located within the active area based on the angle of arrival.

By basing the determination of whether the portable key device is located within the active area based on the angle of arrival, rather than on RSSI based signal levels as in the prior art, a more stable determination is provided. Signal levels can fluctuate and be interfered with depending on a great number of factors while the timings of signal reception are much more dependent. Hence, the probability of determining a correct position of a portable key device is significantly increased. Moreover, angle of arrival is very difficult to manipulate by an attacker, since the same signal is received by the two antennas in the antenna pair. Since the line between the pair of antennas crosses the barrier, this allows inside/outside detection in relation to the barrier.

The active area may be on the outside of the barrier. In one embodiment, the active area is equal to the area outside of the barrier.

The pair of antennas may be provided such that the line between the pair of antennas is perpendicular, within a margin of error, to the barrier. Perpendicular is here to be construed as perpendicular in the same plane. In other words, the line between the pair of antennas is perpendicular to a main dimension of the barrier in the same plane as the line between the pair of antennas.

The method may further comprise the step of: determining a range of possible positions of the portable key device, based on the angle of arrival. In such a case, the step of determining whether the portable key device is located within the active area comprises determining whether the range of possible positions are within the active area.

The method may further comprise the step of: determining a distance to the portable key device in relation to the antennas. In such a case, the step of determining a range of possible positions comprises determining a range of possible positions position based on the distance.

The step of determining a range of possible positions may comprise determining positions in three dimensions.

According to a second aspect, it is presented an access control device arranged to determine whether a portable key device is located in an active area in relation to a barrier. The access control device comprises: a processor; and a memory storing instructions that, when executed by the processor, causes the access control device to: detect an angle of arrival of a wireless signal from the portable key device using a pair of antennas provided such that a line between the pair of antennas crosses the barrier; and determine whether the portable key device is located within the active area based on the angle of arrival.

The active area may be on the outside of the barrier.

The pair of antennas may be provided such that the line between the pair of antennas is perpendicular, within a margin of error, to the barrier.

The access control device may further comprise instructions that, when executed by the processor, causes the access control device to: determine a range of possible positions of the portable key device, based on the angle of arrival; and wherein the instructions to determine whether the portable key device is located within the active area comprise instructions that, when executed by the processor, causes the access control device to determine whether the range of possible positions are within the active area.

The access control device may further comprise instructions that, when executed by the processor, causes the access control device to determine a distance to the portable key device in relation to the antennas; and wherein the instructions to determine a range of possible positions comprise instructions that, when executed by the processor, causes the access control device to determine a range of possible positions based on the distance.

According to a third aspect, it is presented a computer program for determining whether a portable key device is located in an active area in relation to a barrier. The computer program comprises computer program code which, when run on an access control device, causes the access control device to: detect an angle of arrival of a wireless signal from the portable key device using a pair of antennas provided such that a line between the pair of antennas crosses the barrier; and determine whether the portable key device is located within the active area based on the angle of arrival.

According to a fourth aspect, it is presented a computer program product comprising a computer program according to the third aspect and a computer readable means on which the computer program is stored.

Generally, all terms used in the claims are to be interpreted according to their ordinary meaning in the technical field, unless explicitly defined otherwise herein. All references to "a/an/the element, apparatus, component, means, step, etc." are to be interpreted openly as referring to at least one instance of the element, apparatus, component, means, step, etc., unless explicitly stated otherwise. The steps of any method disclosed herein do not have to be performed in the exact order disclosed, unless explicitly stated.

BRIEF DESCRIPTION OF THE DRAWINGS

The invention is now described, by way of example, with reference to the accompanying drawings, in which.

DETAILED DESCRIPTION

The invention will now be described more fully hereinafter with reference to the accompanying drawings, in which certain embodiments of the invention are shown. This invention may, however, be embodied in many different forms and should not be construed as limited to the embodiments set forth herein; rather, these embodiments are provided by way of example so that this disclosure will be thorough and complete, and will fully convey the scope of the invention to those skilled in the art. Like numbers refer to like elements throughout the description.

Figure 1:
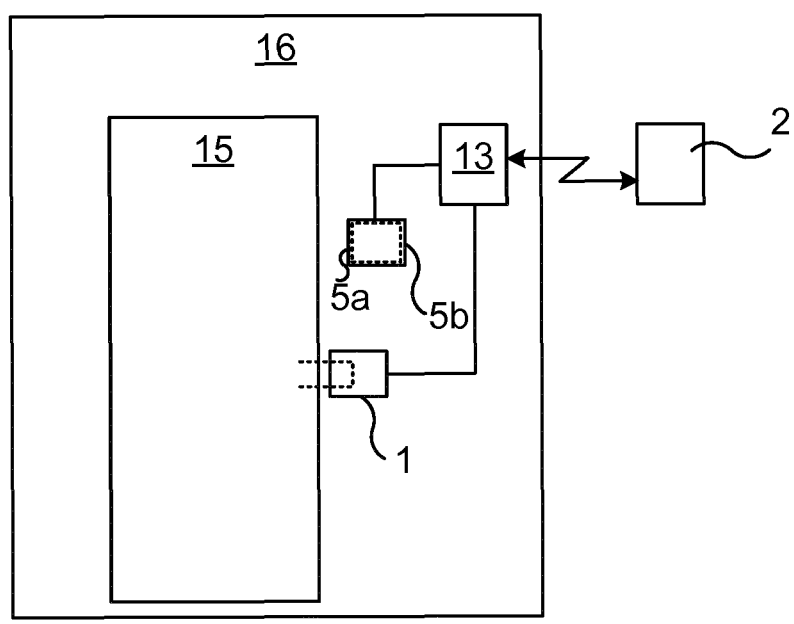
FIG. 1 is a schematic diagram showing an environment in which embodiments presented herein can be applied.

FIG. 1 is a schematic diagram showing an environment in which embodiments presented herein can be applied.

Access to a physical space 16 is restricted by a physical barrier 15 which is selectively unlockable. For instance, the barrier 15 can be a door, gate, hatch, window, etc. In order to unlock the barrier 15, an access control device 13 is provided. The access control device 13 is connected to a physical lock device 1, which is controllable by the access control device 13 to be set in an unlocked state or locked state. In this embodiment, the access control device 13 is mounted close to the physical lock device 1.

The access control device 13 communicates with a portable key device 2 over a wireless interface using a plurality of antennas 5a-b. The portable key device 2 is any suitable device portable by a user and which can be used for authentication over the wireless interface. The portable key device 2 is typically carried or worn by the user and may be implemented as a mobile phone, a smartphone, a key fob, wearable device, smart phone case, RFID (Radio Frequency Identification) card, etc. In FIG. 1, two antennas 5a-b can be seen, where the first antenna 5a is provided in front of the second antenna 5b. However, there may be more antennas provided in connection with the access control device 13. Using wireless communication, the authenticity and authority of the portable key device can be checked in an unlock procedure, e.g. using a challenge and response scheme, after which the access control device 13 grants or denies access. Alternatively or additionally, the portable key device can be used in the same way to, when granted, trigger the barrier to be opened e.g. using a door opener. As described in more detail below, the antennas are also used to detect an angle of arrival to the portable key device 2, to thereby determine whether the portable key device 2 is within an active area in relation to the barrier 15. The active area is defined such that it is beneficiary to trigger access control when the portable key device is located in the active area.

Providing multiple antennas provides additional benefits. For instance, the antennas can be used for beam forming, multiple input/multiple output (MIMO) transmissions, redundancy between antennas, differential antennas, etc.

When access is granted, the access control device 13 sends an unlock signal to the lock device 1, whereby the lock device 1 is set in an unlocked state. In this embodiment, this can e.g. imply a signal over a wire-based communication, e.g. using a serial interface (e.g. RS485, RS232), Universal Serial Bus (USB), Ethernet, or even a simple electric connection (e.g. to the lock device 1), or alternatively a wireless interface. When the lock device 1 is in an unlocked state, the barrier 15 can be opened and when the lock device 1 is in a locked state, the barrier 15 cannot be opened. In this way, access to a closed space 16 is controlled by the access control device 13. It is to be noted that the access control device 13 and/or the lock device 1 can be mounted in a fixed structure (e.g. wall, frame, etc.) by the physical barrier 15 (as shown) or in the physical barrier 15 (not shown).

Figure 2A:
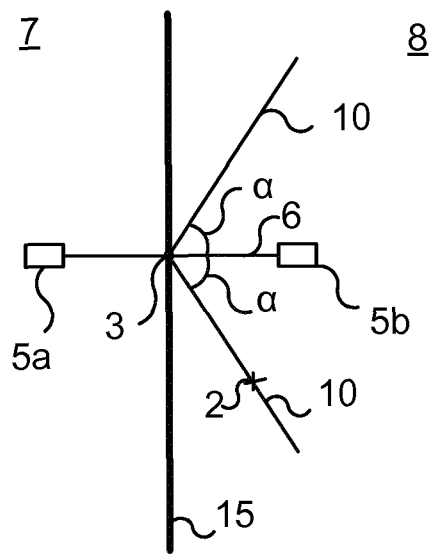
FIGS. 2A-B are schematic top view diagrams illustrating how angles of arrival are used to determine a position of a portable key device in the environment shown in FIG. 1.
Figure 2B:
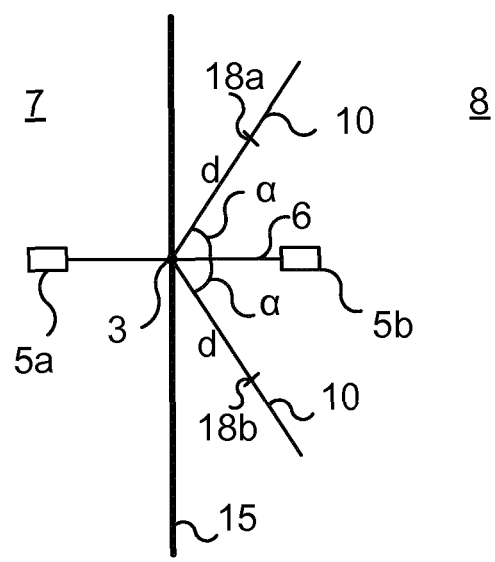

FIGS. 2A-B are schematic top view diagrams illustrating how angle of arrival is used to determine a position of a portable key device in the environment shown in FIG. 1. By determining the position of the portable key device, it can be determined whether the portable key device is within an active area or not. In the embodiment of FIG. 2A, the active area is defined simply as the outside 8 (of the barrier). When the portable key device is located in the active area, further actions related to unlocking and/or opening of the barrier can be performed. In this way, inadvertent unlocking and/or opening of the barrier is prevented. Inside is to be construed as the side of the barrier which is protected from access using the barrier. Outside is the opposite side from the inside. It is to be noted that the outside of the barrier can be on the inside in relation to another barrier.

In FIG. 2A, a pair of antennas, consisting of a first antenna 5a and a second antenna 5b, are shown, with a line 6 between them. The line 6 is a straight line and does not need to exist physically. A midpoint 3 is shown on the line 6 in a centre position between the first antenna 5a and the second antenna 5b. The first antenna 5a and second antenna 5b are separated. With UWB (Ultra Wide Band) transmissions, the distance between a pair of antennas can be as small as three cm.

In this way, when a wireless signal is received from the portable key device 2, a time difference in receiving the wireless signal can be detected. This can e.g. be detected using a phase difference between the received signals. Using the time difference, an angle of arrival (AoA) α is calculated. The AoA α is an angle in relation to the line 6 between the pair of antennas 5a, 5b. In other words, from the midpoint 3, the portable key device can be anywhere on a cone 10 defined by the AoA α. In FIG. 2A, a top view of that cone is projected in a plane which is perpendicular to the barrier 15.

Using the AoA α, it can be determined whether the portable key device 2 is located on the outside 8 or on the inside 7 of the barrier 15. This is sufficient accuracy when the active area is defined as the outside of the barrier 15.

In FIG. 2B, a distance d to the portable key device 2 is also determined, e.g. using two way ranging (see below). Using the distance d and the angle α, the possible positions of the portable key device are limited even further. In the top view of FIG. 2B, the only possible positions for the portable key device are a first position 18a and a second position 18b. If this is expanded to three dimensions, the possible positions are defined as a circle at a distance d from the midpoint, along the cone 10 defined by the AoA α.

By basing this position determination on AoA, rather than on RSSI based signal levels as in the prior art, a more stable determination is provided. Signal levels can fluctuate and be interfered with depending on a great number of factors while the timings of signal reception are much more dependent. Hence, the possibility of determining a correct position of a portable key device is significantly increased. Moreover, AoA is very difficult to manipulate by an attacker, since the same signal is received by the two antennas in the antenna pair. Once the position is known, this can be compared with a predefined active area to determine whether to proceed with an unlock and/or open procedure for the barrier. For instance, the active area can be all of the outside 8, whereby if the portable key device is on the outside 8, the unlock/open procedure can proceed. Moreover, it is sufficient with two antennas for this procedure, even if more antennas can be used to gain better accuracy.

It is to be noted that the two pairs of antennas do not need to be on separate sides of the barrier, but could be on the same side but separate from each other.

Figure 3:
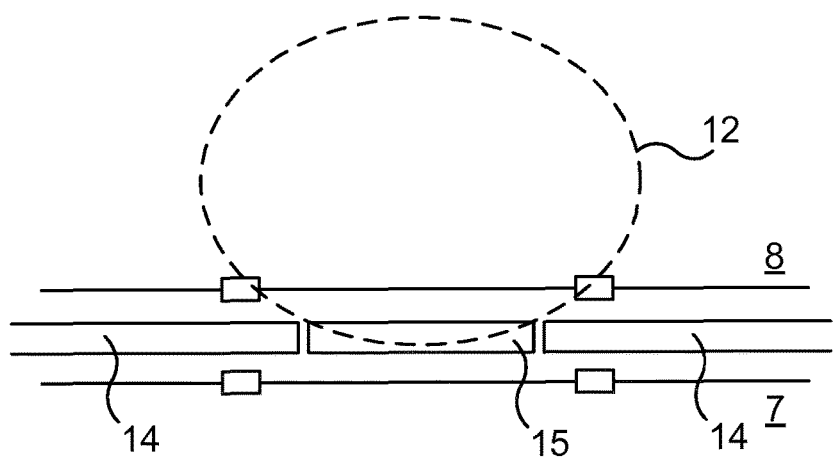
FIG. 3 is a schematic top view illustrating an alternative active area for use in the environment of FIG. 1.

FIG. 3 is a schematic top view illustrating an alternative active area for use in the environment of FIG. 1. Here, the active area 12 is defined more narrowly than simply the outside of a door. In fact, the active area 12 can be defined in any suitable way. Once the possible positions are determined as explained above, it can be determined whether all possible positions are within the active area, whereby the portable key device is determined to be in the active area, after which further processing such as unlocking and/or opening of the barrier 15 can be triggered.

It is to be noted that the active area 12 can equally well be defined on the inside, e.g. for unlocking windows. Furthermore, the active area 12 can be determined in three dimensions, e.g. for preventing portable key devices on other floors from being considered to be in an active area. For instance, the active area can be limited to correspond in height to a floor of a building where the barrier is located.

Figure 4:
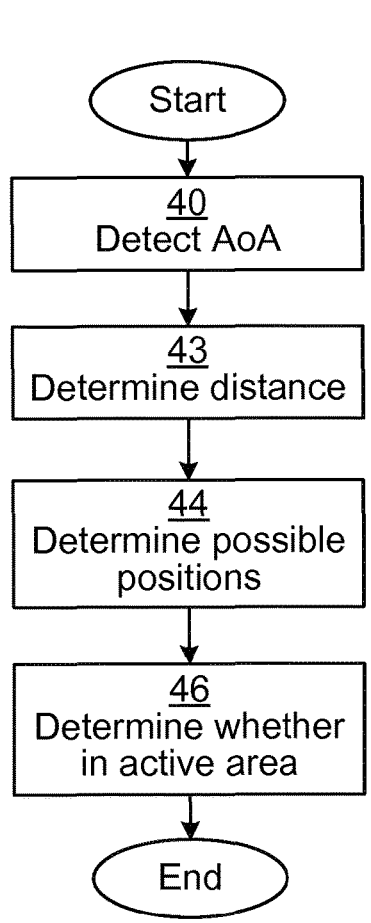
FIG. 4 is a flow chart illustrating an embodiment of a method performed in the access control device of FIG. 1 for determining whether a portable key device is within an active area in relation to a barrier.

FIG. 4 is a flow chart illustrating an embodiment of a method performed in the access control device of FIG. 1 for determining whether a portable key device is located within an active area in relation to a barrier.

The method can e.g. be started when proximity of a portable key device is detected. Optionally, the method is performed repeatedly indefinitely as long as the access control device is operative.

In a detect AoA step 40, an angle of arrival of a wireless signal from the portable key device is detected using the pair of antennas. The antennas are provided such that a line between the pair of antennas crosses the barrier. In one embodiment, the pair of antennas is provided such that the line (6 of FIGS. 2A-B) between the pair of antennas is perpendicular, within a margin of error, to the barrier 15. The margin of error can e.g. be +−10 degrees, +−5 degrees or +−2 degrees. In one embodiment, the margin of error is +−1 degree. The line between the antennas can be defined strictly as between the antennas, i.e. a straight line from one of the antennas to the other of the antennas.

In an optional determine distance step 43 a distance to the portable key device in relation to the antennas is detected. This can be e.g. be done using two way ranging from one or both antennas, where a first signal is sent to the portable key device from the antenna, after which the portable key device responds with a second signal. Using the time difference from when the first signal was sent and when the second signal was received, the distance to the portable key device can be determined.

In an optional determine possible positions step 44, a range of possible positions of the portable key device is determined, based on the angle of arrival. When the distance is available from performing step 43, the range of possible positions is also based on the distance, e.g. shown in FIG. 2B.

The positions can be determined in two dimensions, which may be more simple to calculate and may be sufficient when only one floor is applicable. Alternatively, the positions can be determined in three dimensions, e.g. for preventing portable key devices on other floors from being considered to be in an active area. For instance, the active area can be limited to correspond in height to a floor of a building where the barrier is located.

In a determine whether in active area step 46, it is determined whether the portable key device is located within the active area based on the angle of arrival. As explained above, the active area can be defined in two dimensions or in three dimensions.

In one embodiment, the active area is defined as anywhere on the outside of the barrier. In one embodiment, the active area is defined by an external border, such that the portable key device is in the active area when it is inside the external border (e.g. as shown in FIG. 3 and described above).

When the determine possible positions step 44 is performed, the determine whether in active area step 46 comprises determining whether the range of possible positions are within the active area. If all possible positions are within the active area, the portable key device can then be considered to be in the active area.

The knowledge of whether the portable key device is within the active area or not is used to then decide whether to proceed with access control or not. If the portable key device is determined to be within the active area, then the access determination procedure can proceed, resulting in granted or denied access. On the other hand, if the portable key device is determined to be outside the active area, no further access determination is performed. When access control is performed without user interaction, this prevents someone on outside the active area from unlocking the lock device by simply walking by the access control device. Alternatively or additionally, the same logic can be used to determine whether to open the barrier, e.g. using an automatic door opener. In other words, the usability of longer range wireless radio is achieved, but with the location security of the prior art RFID based solutions. Moreover, by separating the antennas from the access control device, the hardware can be placed in any suitable position in the vicinity. For instance, the access control device can be placed in a position in the barrier or surrounding structure which is not accessible unless the barrier is open, to provide further protection against attacks. Alternatively, the access control device can be placed on the inside or door opener and still control access for portable key devices on the outside.

Figure 5:
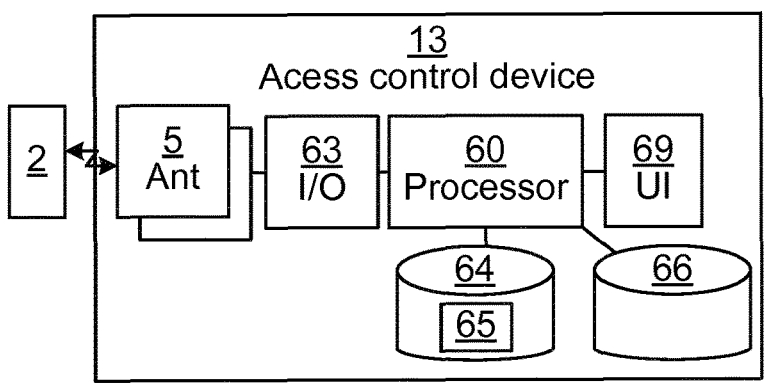
FIG. 5 is a schematic diagram illustrating an embodiment of the access control device of FIG. 1.

FIG. 5 is a schematic diagram illustrating an embodiment of the access control device 13 of FIG. 1.

A processor 60 controls the general operation of access control device 13. The processor 60 can be any combination of one or more of a suitable central processing unit (CPU), multiprocessor, microcontroller unit (MCU), digital signal processor (DSP), application specific integrated circuit (ASIC) etc., capable of executing software instructions or otherwise configured to behave according to predetermined logic. Hence, the processor 60 can be capable of executing software instructions 65 stored in a memory 64, which can thus be a computer program product. The processor 60 can be configured to execute the method described with reference to FIG. 4 above.

The memory 64 can be any combination of read and write memory (RAM) and read only memory (ROM). The memory 64 also comprises persistent storage, which, for example, can be any single one or combination of magnetic memory, optical memory, solid state memory or even remotely mounted memory.

A data memory 66 is also provided for reading and/or storing data during execution of software instructions in the processor 60, for instance angles of arrivals and distances. The data memory 66 can be any combination of read and write memory (RAM) and read only memory (ROM).

The access control device 13 further comprises an I/O interface 63 for communicating with other external entities such as the lock device 1 and a portable key device 2, e.g. to exchange digital authentication data. The I/O interface 63 communicates with the portable key device 2 over a wireless interface using a plurality of antennas 5. The antennas 5, as explained above, can be used to determine the position of the portable key device. The I/O interface 63 supports wireless communication over any suitable wireless interface, e.g. using Bluetooth, Bluetooth Low Energy (BLE), any of the IEEE 802.15 standards, Radio Frequency Identification (RFID), Near Field Communication (NFC), any of the IEEE 802.11 standards, wireless USB, etc. The I/O interface 63 may also support wire-based communication, e.g. using Universal Serial Bus (USB), Ethernet, or even a simple electric connection, e.g. to the lock device 1.

Optionally, the access control device 13 also includes a user interface 9, e.g. comprising any one or more of a light emitting diodes (LED) or other lights, a display, keys or keypad, etc.

Optionally, the access control device 13 is combined with the lock device 1 in a single device. In such a case, one or more of the components of the access control device 13 can be shared with the lock device 1. In another embodiment, the access control device 13 is housed within a housing of a door opener. This provides for a simple installation. In such an embodiment, some or all of the antennas may also be places within the housing of the door opener.

Figure 6:
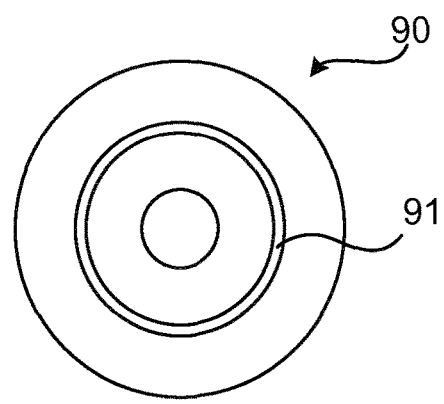
FIG. 6 shows one example of a computer program product comprising computer readable means.

FIG. 6 shows one example of a computer program product comprising computer readable means. On this computer readable means a computer program 91 can be stored, which computer program can cause a processor to execute a method according to embodiments described herein. In this example, the computer program product is an optical disc, such as a CD (compact disc) or a DVD (digital versatile disc) or a Blu-Ray disc. As explained above, the computer program product could also be embodied in a memory of a device, such as the computer program product 64 of FIG. 5. While the computer program 91 is here schematically shown as a track on the depicted optical disk, the computer program can be stored in any way which is suitable for the computer program product, such as a removable solid state memory, e.g. a Universal Serial Bus (USB) drive.

The invention has mainly been described above with reference to a few embodiments. However, as is readily appreciated by a person skilled in the art, other embodiments than the ones disclosed above are equally possible within the scope of the invention, as defined by the appended patent claims.

What is claimed is:

1. A method for determining whether a portable key device is located in an active area in relation to a barrier, the method being performed in an access control device and comprising the steps of:
    detecting an angle of arrival of a wireless signal from the portable key device using two and only two antennas provided such that a straight line between the two and only two antennas crosses the barrier;
    determining whether the portable key device is located within the active area based on the angle of arrival, wherein the active area is defined to be outside of the barrier; and
    triggering access control when the portable key device is determined to be located in the active area.

2. The method according to claim 1, wherein the active area is part of a three-dimensional volume located on the outside of the barrier.

3. The method according to claim 1, wherein the two and only two antennas are provided such that the line between the two and only two antennas is perpendicular, within a margin of error, to the barrier.

4. The method according to claim 1, further comprising the step of:
    determining a range of possible positions of the portable key device, based on the angle of arrival; and
    wherein the step of determining whether the portable key device is located within the active area comprises determining whether the range of possible positions are within the active area.

5. The method according to claim 4, further comprising the step of:

determining a distance to the portable key device in relation to the two and only two antennas; and wherein the step of determining a range of possible positions comprises determining a range of possible positions based on the distance.

6. The method according to claim 5, wherein the step of determining a range of possible positions comprises determining positions in three dimensions.

7. An access control device arranged to determine whether a portable key device is located in an active area in relation to a barrier, the access control device comprising:
   a processor; and
   a memory storing instructions that, when executed by the processor, causes the access control device to:
   detect an angle of arrival of a wireless signal from the portable key device using two and only two antennas provided such that a straight line between the two and only two antennas crosses the barrier;
   determine whether the portable key device is located within the active area based on the angle of arrival, wherein the active area is defined to be outside of the barrier; and
   trigger access control when the portable key device is determined to be located in the active area.

8. The access control device according to claim 7, wherein the active area is part of a three-dimensional volume located on the outside of the barrier.

9. The access control device according to claim 7, wherein the two and only two antennas are provided such that the line between the two and only two antennas is perpendicular, within a margin of error, to the barrier.

10. The access control device according to claim 7, further comprising instructions that, when executed by the processor, causes the access control device to: determine a range of possible positions of the portable key device, based on the angle of arrival; and wherein the instructions to determine whether the portable key device is located within the active area comprise instructions that, when executed by the processor, causes the access control device to determine whether the range of possible positions are within the active area.

11. The access control device according to claim 10, further comprising instructions that, when executed by the processor, causes the access control device to determine a distance to the portable key device in relation to the two and only two antennas; and wherein the instructions to determine a range of possible positions comprise instructions that, when executed by the processor, causes the access control device to determine a range of possible positions based on the distance.

12. A computer program stored in a non-transitory medium for determining whether a portable key device is located in an active area in relation to a barrier, the computer program comprising computer program code which, when run on an access control device, causes the access control device to:
   detect an angle of arrival of a wireless signal from the portable key device using two and only two antennas provided such that a straight line between the two and only two antennas crosses the barrier;
   determine whether the portable key device is located within the active area based on the angle of arrival, wherein the active area is defined to be outside of the barrier; and
   trigger access control when the portable key device is determined to be located in the active area.

13. A non-transitory computer program product comprising a computer program according to claim 12 and a non-transitory computer readable means on which the computer program is stored.

* * * * *